March 31, 1964 I. L. TWYMAN 3,127,005
SELF-CONTAINED PORTABLE PULPWOOD LOADER
Filed Jan. 15, 1962 3 Sheets-Sheet 1
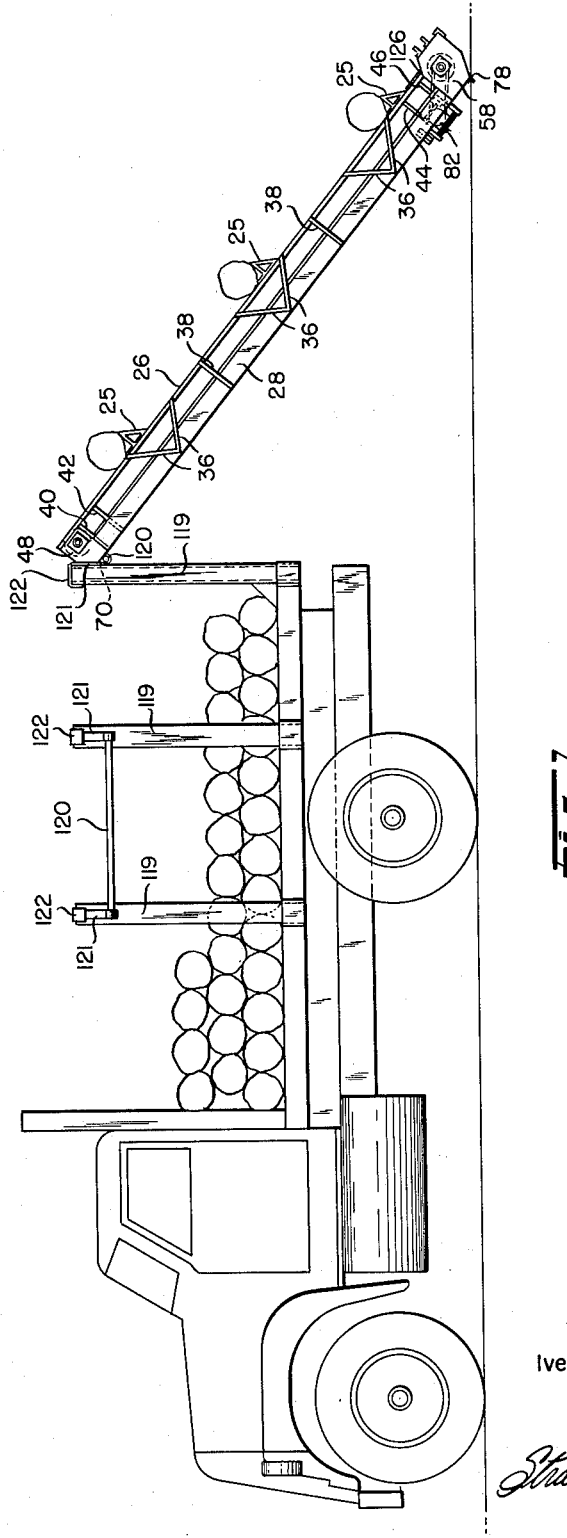
INVENTOR
Iverson Lewis Twyman
ATTORNEYS

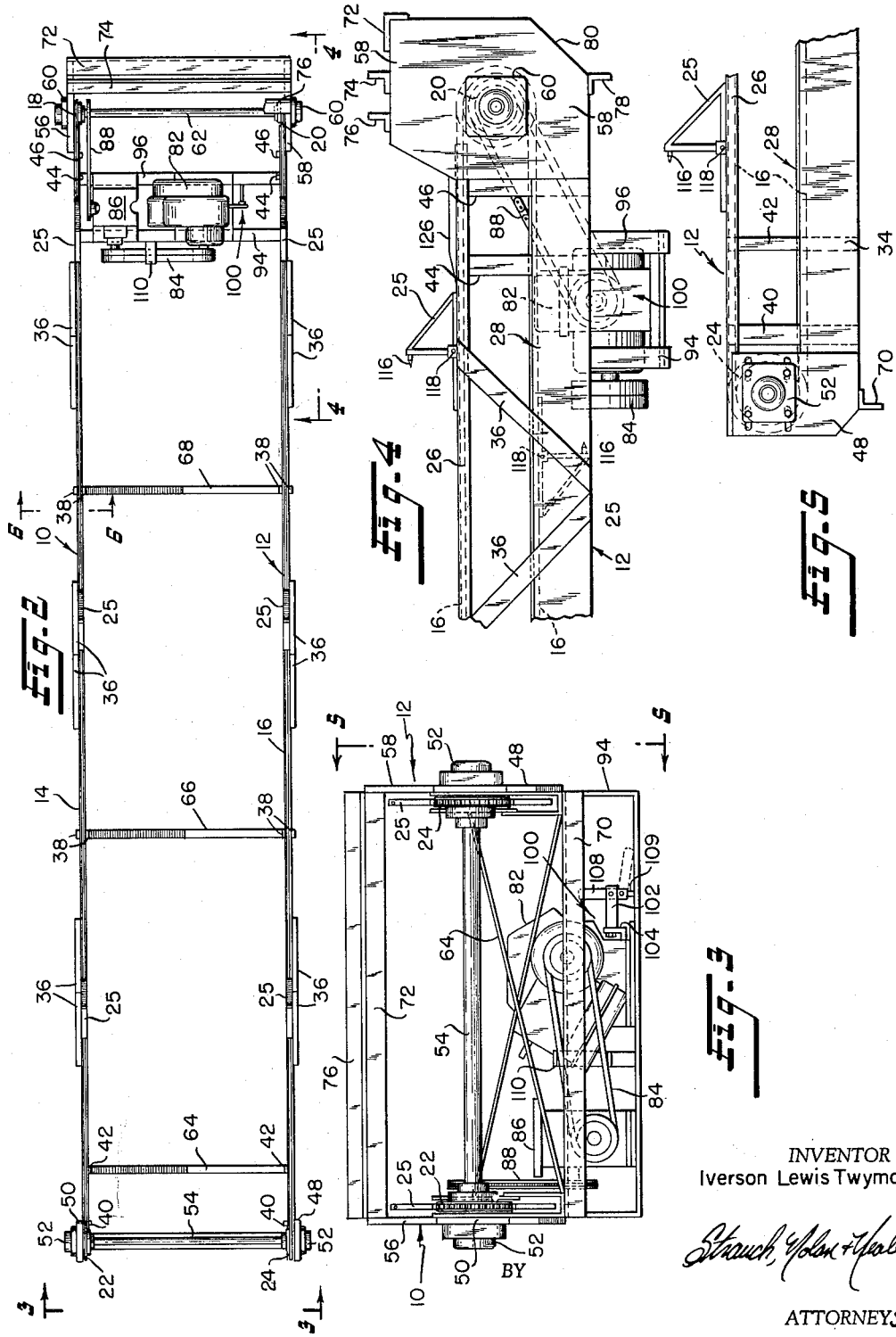

March 31, 1964     I. L. TWYMAN     3,127,005
SELF-CONTAINED PORTABLE PULPWOOD LOADER
Filed Jan. 15, 1962     3 Sheets-Sheet 3
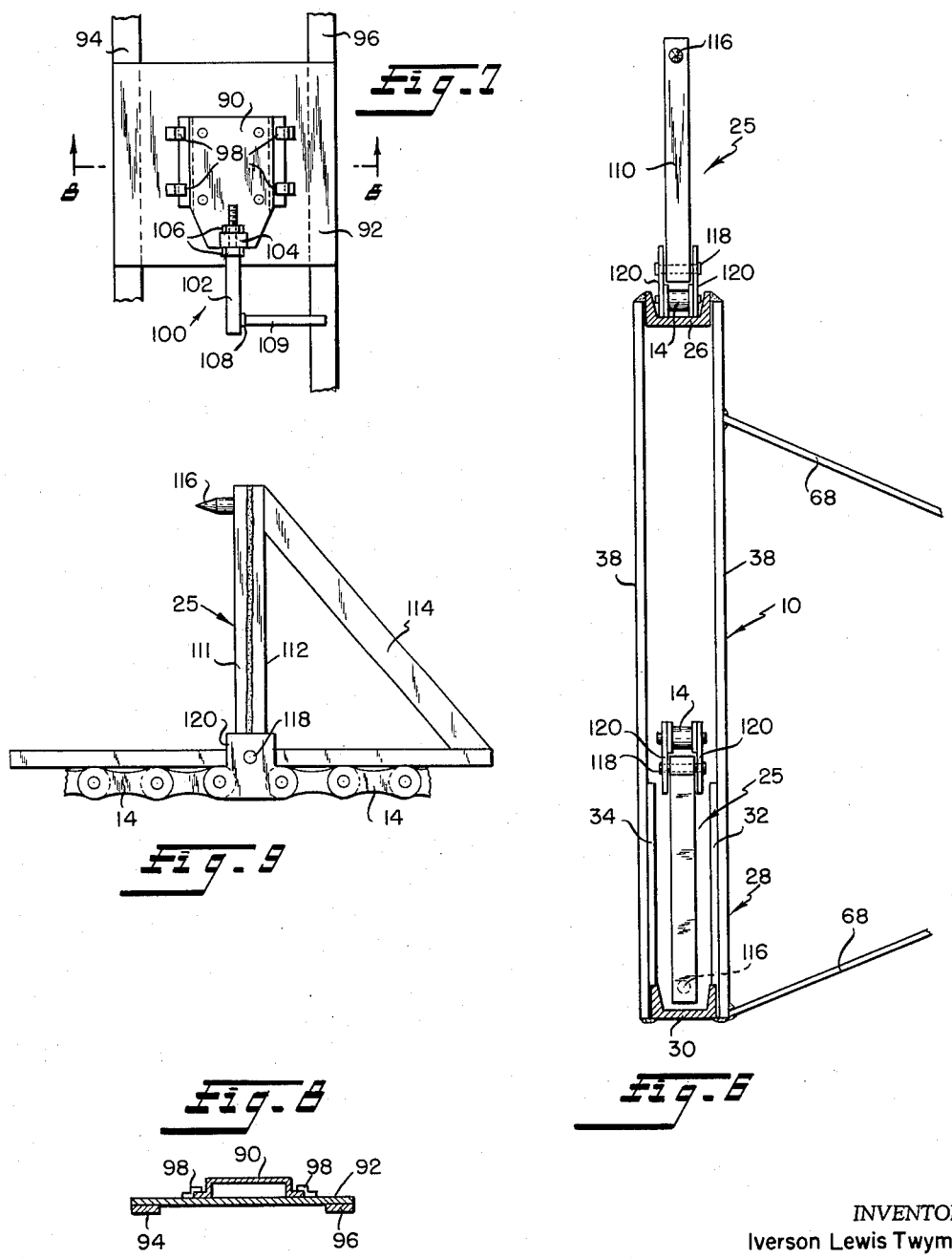
INVENTOR
Iverson Lewis Twyman
BY
ATTORNEYS

United States Patent Office 3,127,005
Patented Mar. 31, 1964

3,127,005
SELF-CONTAINED PORTABLE PULPWOOD LOADER
Iverson Lewis Twyman, 999 SW. 1st St., Miami, Fla.
Filed Jan. 15, 1962, Ser. No. 166,139
5 Claims. (Cl. 198—173)

This invention relates to loaders for pulpwood and similar small short logs and billets and more particularly to such loaders of novel construction which are portable and self-contained.

The loaders of the present invention have particular utility in connection with field operations such as the loading of pulpwood logs onto a truck at or near the site at which the trees from which the pulpwood is cut have been felled. For example, in the pulpwood industry it has been common practice for many years to collect pulpwood logs in relatively small trucks which are usually manned by a driver and a helper. The driver and a helper fell selected marked trees, cut them into billets of about five feet in length and load the billets onto the truck for delivery to a mill.

A portion of the physical labor associated with this operation has been eliminated by the advent and wide use of the gasoline-powered saw. However, prior to the present invention the time-consuming and burdensome task of loading the wood onto the truck has been accomplished by hand. The hand loading of the wood accounts for a major portion of the time and a major portion of the total labor involved in the supplying of pulpwood logs to the mill.

In recognition of this fact heavy, expensive power loading equipment such as cranes, fork lifts and similar units have been utilized to accomplish the loading operation mechanically. However, these expedients involve practical difficulties as well as obvious economic disadvantages. It is difficult to maneuver the equipment into the desired position and to group or bind the billets to prepare them for the loading operation.

The use of relatively large conventional power loaders of the conveyor type has also been proposed. However, the difficulties in either maneuvering such loaders to the loading site or in the alternative carrying the billets to the loader has substantially nullified the limited advantages offered by such prior conveyors.

The cost of all such heavy equipment places it beyond the means of all but the largest scale operations.

With the foregoing considerations in mind it is the principal purpose and object of the present invention to provide novel conveyor-loaders which are self-contained and fully portable and which may be set up for use and operated by one or two men.

It is a further important object of the present invention to provide lightweight yet exceptionally rugged self-powered portable loaders which are fully protected against damage from the applied load and from underbrush, rocks and the like and which thus may be used in any type of terrain.

It is a further object of the present invention to provide improved loaders of the conveyor type which are particularly adapted for loading pulpwood billets onto a truck and which minimize the lifting requirements necessary to feed the billets to the conveyor and which automatically deliver the billets to the truck in proper orientation.

It is a more specific object of the present invention to provide improved self-contained portable pulpwood loaders which include a pair of endless parallel chains driven in synchronism, each chain containing flights of novel construction which distribute the weight of the billets and assure retention of the billets on the flights even when the loader is steeply inclined.

It is a further specific object of the present invention to provide self-contained portable pulpwood loaders which include a lightweight yet rigid frame construction, a pair of endless flight equipped chains arranged in parallel relation at opposite sides of the frame and a gasoline-powered engine carried by the frame and arranged to drive the chains in synchronism.

Additional objects and advantages of the present invention will become apparent as the description proceeds in connection with the accompanying drawings in which:

FIGURE 1 is a side elevation of the loader of the present invention as it appears in use;

FIGURE 2 is a top plan view of the loader;

FIGURE 3 is an enlarged end elevation looking in the direction of arrows 3—3 of FIGURE 2;

FIGURE 4 is an enlarged fragmentary side elevation of a portion of the loader looking in the direction of arrows 4—4 of FIGURE 2;

FIGURE 5 is an enlarged fragmentary side elevation of a portion of the loader looking in the direction of arrows 5—5 of FIGURE 3;

FIGURE 6 is an enlarged fragmentary transverse section illustrating one side of the frame of the loader, the section being taken along line 6—6 of FIGURE 2;

FIGURE 7 is a fragmentary top plan view of the motor mount assembly with the motor removed;

FIGURE 8 is a transverse section taken along line 8—8 of FIGURE 7 showing details of the construction; and FIGURE 9 is a side view of one of the loader flights.

Referring now more particularly to the drawings, the loader of the present invention is of generally rectangular form and comprises two identical side frame sections indicated generally at 10 and 12 connected by a minimum number of lightweight yet strong cross members.

Each of the side frame sections 10 and 12 is so constructed as to guide, support and protect both the upper and lower reaches of endless chains 14 and 16 which extend between drive sprocket assemblies 18 and 20 positioned adjacent one end of the loader and idler sprockets 22 and 24 positioned at the opposite end of the loader.

As explained in detail below the chains 14 and 16 are equipped with flights 25 of novel construction and the chains are driven in synchronism so that a log is simultaneously engaged by a flight on each chain at the lower end of the loader, and carried smoothly to the top of the loader.

As is best shown in FIGURE 6, the side frame structures comprise an upper channel 26 and a lower channel assembly 28, each being of upwardly facing U-shaped configuration. The upper U-shaped steel channel member 26 has a width slightly greater than the width of the chains 14 or 16 and a depth slightly less than the height of the chain. The channel provides a smooth flat surface along which the upper reach of the chains 14 or 16 pass and effectively guides the chains against lateral movements.

The lower channel assembly 28 comprises an upwardly facing steel channel member 30 of the same configuration as the upper channel member, the sides of the lower channel member being upwardly extended by inner and outer steel plates 32 and 34 welded to the upper side edges of the channel 30. The upper and lower channel assemblies are rigidly connected along their length by a suitable number of steel strips. In a typical case three sets of strips 36 arranged in a V configuration are welded to the outer surface of the upper and lower channels at suitably spaced points along their length. Two sets of vertically extending strips 38 are positioned between the strips 36, one of each of the sets of strips 38 being welded to the outer surface of the frame, the other of the strips being welded to the inner surface. To provide additional rigidity additional vertical strips 40, 42, 44 and 46 are welded to the inner surfaces of the upper and lower channels adjacent their opposite ends.

At their forward ends the opposite side frame structures 10 and 12 are welded at their outer surfaces to plates 48 and 50 which carry bearing assemblies 52 rotatably a shaft 54 on which the idler sprockets 22 and 24 are mounted. The bearing assemblies 52 are mounted for adjustment to control the tension of the chains 14 and 16. At their rearward ends the outer surfaces of the channel assemblies 26 and 28 are welded to the inner surface of plates 56 and 58 which carry identical bearing assemblies 60 which rotatably support a shaft 62 carrying the driven sprockets 18 and 20.

Lateral rigidity is imparted to the loader by three sets of X braces 64, 66 and 68 which are preferably steel strips, the opposite ends of which are welded to the vertical brace members 42 or 38. The forward ends of the frame sections 10 and 12 are rigidly connected by an angle iron 70, which also serves as a hook to facilitate the positioning of the loader for use. At the rearward end of the loader the plates 46 and 58 are connected by three upper angle irons 72, 74 and 76 which perform the additional function of protecting the shaft 62 and the associated sprockets from damage, and a lower angle iron 78 which also aids in retaining the loader in the position in which it is placed for use.

In this connection it will be noted that the lower rear corners of the plates 56 and 58 are cut away to provide an inclined surface 80 on which the loader rests when it is in use.

As stated above it is a feature of particular importance that the loader of the present invention is self-powered and self-contained and is not dependent for its operation on an external power source. In the illustrated embodiment of the invention the power source is a relatively small, for example, 2½ horsepower, gasoline engine of any commercially available type indicated generally at 82. Power is transmitted from the engine 82 through a belt drive 84 to the input side of a conventional speed reducer assembly 86, the output shaft of which is connected by a chain 88 to the shaft 62 which carries the driven chain sprockets 18 and 20. The engine 82 is bolted or otherwise rigidly secured to a supporting plate 90 (FIGURES 7 and 8) mounted for sliding movement on a base plate 92 welded to cross straps 94 and 96 which extend across the loader and the upturned ends of which are welded to the respective side frame 10 and 12. The mounting plate 90 is slidable along the plate 92 and held in place by clips 98.

The position of the engine and thus the tension of the belt drive 84 is controlled by a clutch mechanism indicated generally at 100. The clutch mechanism includes a rod 102, a threaded end of which extends loosely through an apertured lug on 104 on the end of the slidable plate 90. The rod is adjustably retained in position by nuts 105. The free end of the rod is pivotally connected to a control lever 108 which in turn is pivotally supported on the end of a pivot element 109 welded to the strip 96. When the lever 108 is upright the tension of the belt 84 is relieved. When the control lever is rotated in a clockwise direction as viewed in FIGURE 3 to an over-center position the belt 84 is held with proper operating tension. A clip 110 carried by the strap 94 prevents the belt from assuming an elliptical shape when the belt tension is relaxed thus assuring disengagement of the drive.

The drive is so arranged as to move the upper reach of the conveyor chains from right to left as viewed in FIGURES 1 and 2, thus carrying the flights 25 in the same direction. As best shown in FIGURE 6 the flights 25 each comprise a pair of angle irons 111 and 112 welded in back to back relation, the flights being of any appropriate heights to accommodate the size of log intended to be handled by the loader and the width of the flights being essentially the same as the width of the conveyor chain. A diagonal stiffener brace 114 connects the free ends of the rearwardly facing angle iron 112 to provide additional rigidity. The upper end of the forward angle iron 110 carries a short sharp spur 116 to assist in holding the pulpwood firmly in place on the flight.

The flights are pivotally connected to the conveyor chains at suitably spaced points, i.e. on 54" centers by a pivot pin 118 carried by the flight adjacent the lower end of the juncture between the forwardly and rearwardly facing angle irons. The pin 118 projects through a pair of identical side plates 120 secured to the chain by the normal chain pins.

The flight and its connection to the conveyor has a number of important advantages. For example, the free pivotal connection at 118 permits the passage of the conveyors freely over sprockets of relatively small diameter without binding or interference of any kind. Further the substantial length of the horizontally extending portions of the flight assure the distribution of the weight imposed by the pulpwood or other load over a substantial portion of the conveyor chain. Further even when the loader is relatively steeply inclined the center of gravity of the pulpwood will be forward of the pivot point 118. Thus the forwardly extending length of the flight prevents the establishment of a rearwardly overturning movement in the flight. The portion of the flight extending rearwardly from the pivot 118 also assures stability of the flight.

In a typical case where the loader is intended for use for handling pulpwood logs which are normally about 5 feet in length and are from 4" to 22" in diameter and weigh from 20 lbs. to 500 lbs., the loader of the invention is approximately 30 inches in width and 14 feet in length and has a weight including the motor and driving mechanism of 200 lbs. The weight of the loader can be further reduced by substituting aluminum or other like metals for steel.

Since the loader of the present invention is self-contained, lightweight and compact it may be readily used as a tool which complements the gas powered chain saw which is the only other tool required by an operator.

In a typical operation the loader is loaded along with a power saw onto a truck which is driven into the woods. After the pulpwood logs have been cut to the desired length the loader is moved to the position shown in FIGURE 1, an operation which can easily be effected by one man. To assist in positioning the upper end of the loader the standard 119 carried by the truck are provided with a cross bar 120. The cross bar is carried by straps 121 which are integral with caps 122 removable fitting over the tops of the standards 119. Preferably the cross bar 120 is welded to one of the straps 121. As shown in FIGURE 1 the angle iron 70 fits over the cross bar 120 to position the loader securely and yet permit its easy removal. An additional cross bar 120 as shown in FIGURE 1 in position to support the loader for side loading when desired.

After the loader is positioned at the side or rear of the truck, the motor is started which, after engagement of the clutch, causes the series of flights 25 to move upwardly to the left at a speed which may be regulated by the operator. The pulpwood logs which have been gathered adjacent the lower end of the loader are then rolled or lifted over the plates 56 and 58 and allowed to roll down along the sloping surface 124 onto guards 126 welded or otherwise suitably secured to the upper surface of the chain guide channel 26. The logs rest in this position until they are picked up by the next pair of flights passing over the sprockets 18 and 20, the guards 126 maintaining the logs out of contact with the conveyor chain. Since the two conveyor chains are synchronized and the flights are installed in aligned relation the log will be simultaneously engaged by a pair of flights and will be carried smoothly to the upper end of the loader and deposited in proper orientation on the truck. The firm engagement with the logs effected by the spurs 116 assures stability of the logs and the flights and renders a mechanical brace connecting the flights unnecessary. The conveyor chains ride smoothly along the surface of the upper channel 26 and because of the distribution of the weight of the log effected by the unique flight construction, friction between the chain and the chain channel is held to a minimum.

When the flights reach the upper end of the loader they deliver the log by a rolling action smoothly onto the truck and the flights pass around the sprockets for return to the lower end of the loader through the lower channel 28 which assures the unobstructed passage of the flights to the lower end of the conveyor regardless of the terrain in which the loader is used.

With the loader of the present invention, an average load of from 10 to 17 thousand pounds, can be loaded into a truck in less than one-third the time required for the manual loading formerly used. The reduction in the manual effort is of course even more significant. Thus the initial cost of the loader will be returned to the owner in the form of increased operating profits within a very short time. The cost of operating the loader is negligible, particularly since it has the same type of engine and the same fuel requirements as the gasoline-powered saw which is presently universally used in such operations. At the end of the loading operation the loader may be lifted down from the truck or may be placed on top of the log load, either operation being effected easily by two men.

The portability of the loader is such that the truck and the loader may be moved several times in the course of loading one truck. Savings in time and effort here are also readily apparent since the weight of the loader is considerably less than the weight of a single large pulpwood log.

Alternately the loader may be positioned at the side of the truck to deliver the pulpwood logs with their axis disposed parallel with the longitudinal axis of the truck body. For such loading the cross bar 120 is supported by the standards at the side of the truck.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A portable self-contained loader for pulpwood or like billets comprising a pair of side frame structures rigidly connected in spaced parallel relation, an endless driven member carried by each side frame structure and extending essentially from end to end thereof, a drive motor rigid with said side frame structures connected to drive said driven members in synchronism, a series of flights carried by each driven member, each flight comprising a central portion extending vertically away from said driven member and a portion extending along the length of said driven member forwardly of said central portion, means at one end of each of said side frame structures providing a rest for a billet deposited thereon, said rest being in a path of said flights, and upper and lower guide assemblies on each side frame structure, the upper guide assembly supporting the upper reach of said driven members and the lower guide assembly enclosing the lower reach of said driven members and the flights carried thereby.

2. A portable self-contained loader for pulpwood or like billets comprising a pair of side frame structures, cross frame members rigidly connecting said side frame structures, a pair of endless chains, one of which is carried by each side frame structure, said chains extending essentially from end to end of said structure, a drive motor rigid with said frame structures connected to drive said chains in synchronism, a series of flights carried by each chain, an upwardly facing U-shaped upper guide structure rigid with each side frame structure for guiding the upper reach of each chain, means at one end of each of said side frame structures providing a rest for a billet deposited thereon, said rest being in the path of said flights, and a lower substantially enclosed guide structure rigid with each side frame structure enclosing and protecting the lower reach of each chain and the flights carried thereby.

3. A portable self-contained loader for pulpwood or like billets comprising a pair of side frame structures rigidly connected in spaced parallel relation, a pair of endless chains, one carried by each side frame structure, said chains extending essentially from end to end of said side frame structures, a drive motor rigid with said side frame structures connected to drive said endless chains in synchronism, a series of flights carried by each chain, each flight comprising a central portion extending vertically away from said chain and portions extending along the length of said chain forwardly and rearwardly of said vertical portion, an upper guide structure rigid with each side frame structure supporting the upper reach of the respective chains, means at one end of each of said side frame structures providing a rest for a billet deposited thereon, said rest being in the path of said flights, and a lower guide structure rigid with said side frame structures substantially enclosing the lower reach of the respective chains and the flights carried thereby.

4. The loader according to claim 3 wherein said flights are pivotally connected to said chain adjacent the juncture between said forwardly and rearwardly extending portions.

5. A portable self-contained loader for pulpwood or like billets comprising a pair of side frame structures rigidly connected in spaced parallel relation, a pair of sprockets carried by each of said frame structures adjacent their opposite ends, end endless chain carried by each pair of sprockets, a drive motor carried by said frame structures and positioned therebetween, means connecting said drive motor to at least one sprocket of each pair to thereby drive said endless chains in synchronism, a series of flights carried by each chain, each flight comprising a central portion extending vertically away from said chain and portions extending along the length of said chain forwardly and rearwardly of said central portion, an upwardly facing U-shaped upper guide structure rigid with each side frame structure for guiding the upper reach of each chain, a lower guide structure rigid with said side frame structures substantially enclosing the lower reach of the respective chains and the flights carried thereby, and means at one end of each of said frame structures providing a rest for a billet deposited thereon, said rest being in the path of said flights whereby a billet deposited on said rest will be picked up by said flights and carried to the opposite end of said frame structures.

References Cited in the file of this patent

UNITED STATES PATENTS

| | | |
|---|---|---|
| 1,426,347 | Bieber | Aug. 22, 1922 |
| 2,708,504 | Puzey | May 17, 1955 |
| 2,807,351 | Carlson | Sept. 24, 1957 |

UNITED STATES PATENT OFFICE
CERTIFICATE OF CORRECTION

Patent No. 3,127,005

March 31, 1964

Iverson Lewis Twyman

It is hereby certified that error appears in the above numbered patent requiring correction and that the said Letters Patent should read as corrected below.

Column 3, line 4, after "ably" insert -- supporting --; line 19, for "46" read -- 56 --; same column 3, line 70, for "heights" read -- height --; column 4, line 23, for "movement in" read -- moment on --; line 45, for "standard" read -- standards --; column 6, line 44, for "end" read -- an --.

Signed and sealed this 4th day of August 1964.

(SEAL)
Attest:

ERNEST W. SWIDER
Attesting Officer

EDWARD J. BRENNER
Commissioner of Patents